(12) United States Patent
Patrito

(10) Patent No.: US 6,443,293 B2
(45) Date of Patent: Sep. 3, 2002

(54) TRANSPORTING INSTALLATION WITH CONVEYOR HAVING IDLING ROLLERS SUPPORTING TRANSPORT MEMBERS

(75) Inventor: Donato Patrito, Leini (IT)

(73) Assignee: Fata Automation S.p.A., Pianezza (IT)

( * ) Notice: Subject to any disclaimer, the term of this patent is extended or adjusted under 35 U.S.C. 154(b) by 34 days.

(21) Appl. No.: 09/756,142

(22) Filed: Jan. 9, 2001

(30) Foreign Application Priority Data

Jan. 13, 2000 (IT) .......................................... MI00U0013

(51) Int. Cl.$^7$ .............................................. B65G 17/42
(52) U.S. Cl. ................ 198/465.1; 198/465.3; 198/779; 198/803.2; 198/867.13
(58) Field of Search .......................... 198/465.1, 465.3, 198/779, 867.13, 803.2, 750.1

(56) References Cited

U.S. PATENT DOCUMENTS

| | | | | |
|---|---|---|---|---|
| 3,912,072 A | * | 10/1975 | Kornylak | 198/183 |
| 4,193,312 A | * | 3/1980 | Cicognani | 74/231 C |
| 4,197,931 A | * | 4/1980 | Matsui et al. | 198/472 |
| 4,613,034 A | * | 9/1986 | Hibi et al. | 198/465.1 |
| 4,712,670 A | * | 12/1987 | Burkhardt | 198/803.1 |
| 4,718,349 A | * | 1/1988 | Wahern | 104/165 |
| 4,807,537 A | * | 2/1989 | Matsuo | 104/129 |
| 4,852,718 A | * | 8/1989 | Kunstmann | 198/465.3 |
| 5,195,630 A | * | 3/1993 | Donovan et al. | 198/465.3 |
| 5,788,056 A | * | 8/1998 | Clopton | 198/779 |
| 5,830,253 A | * | 11/1998 | Kuster et al. | 65/273 |
| 5,896,980 A | * | 4/1999 | Butler | 198/836.1 |
| 6,102,194 A | * | 8/2000 | Charny | 198/795 |
| 6,168,011 B1 | * | 1/2001 | Morsbach | 198/779 |
| 6,325,199 B1 | * | 12/2001 | Becherucci et al. | 198/465.1 |

FOREIGN PATENT DOCUMENTS

DE 4123607 C1 1/1993

* cited by examiner

Primary Examiner—Douglas Hess
(74) Attorney, Agent, or Firm—Jacobson Holman, PLLC

(57) ABSTRACT

A transporting installation (10, 110) comprises at least one conveyor belt (11, 111) on which are mounted at intervals carriages (12, 112) each equipped above with a horizontal roller (13, 113) for support of transport members (14) and side guide wheels (19, 119) running inside parallel opposing and facing C rails (20, 120). For support of roller and wheels the carriage has a U bracket (15, 115) fastened on the belt and with seats opening upward on the U arms for support of a support pin in a zone at the sides of the roller. The ends of the pin project on the two sides of the bracket (15, 115) to each support one of said guide wheels with there being between the wheels and the bracket spacers (22, 122) removable transversally to the pin to free a space for axial running of the guide wheels towards the center of the carriage. In this manner the wheels can be shifted in the direction of withdrawing them from the C guide rails upon removal of the spacers.

7 Claims, 3 Drawing Sheets

US 6,443,293 B2

TRANSPORTING INSTALLATION WITH CONVEYOR HAVING IDLING ROLLERS SUPPORTING TRANSPORT MEMBERS

BACKGROUND OF THE INVENTION

The present invention relates to an improved transporting installation of the type with belt conveyor on which are supported transport members such as skids, pallets, boards and the like.

In the prior art there are known transporting installations where transport members are supported on belt conveyors. The conveyors generally have continuous movement and are provided with release means between the conveyor and the transport member to allow desired stops of the latter. Systems have been proposed for example in which the conveyor belt is equipped above with idling rollers on which the transport members rest. Friction between the rollers and the respective support pins is greater than friction between the rollers and the transport members so that under normal conditions the transport members are entrained by the conveyor. Opposition means can thus stop the transport member by merely restraining it while the conveyor continues to run and cause stopping of any following transport members which might arrive. In accordance with an advantageous solution the idling rollers are assembled on the belt through supporting brackets constrained to the belt so as to form carriages also having side wheels for belt guidance and support. The carriage needs to be guided laterally along the direction of travel because the loads conveyed and resting on the upper rollers can cause drifting and other phenomena.

Other travel disturbances can be caused by small parts or bodies which might fall into the zones affected by the movement. In addition, it is necessary to oppose a possible rotation of the wheel supporting bracket with respect to the belt.

In the prior art various solutions for guiding the belt and keeping the carriage in the correct position have been proposed. For example, it has been proposed to equip the carriage with four side bearing wheels having an appropriate flange or equip the carriage with two or four flangeless side wheels with four shoes mounted opposite the four bracket edges or even equip the carriage with four side wheels to which a shoe would be applied on the central wheel.

The carriage bracket can be fastened to the belt with a fork passing below the belt as set forth in patent DE4123607 or it could be fastened to a support made in a single piece with the belt.

Whether made of low-friction metallic materials or with resins the shoes are a weak member of the system because the metallic structures on which running takes place are steel structural work articles with numerous joints. In addition the shoes are usually fastened to the bracket with screws so that in addition to wear, breakage and chipping there can occur loosening causing jamming with resulting need for stopping the system and consequently loss in production.

Another limitation of the known solutions is the difficulty of disassembly of the carriage from the belt to work on the parts subject to wear or breakage. Indeed, since the side wheels are received in side guide members in the form of rails shaped like the letter C, full accessibility can be had only at the heads while along the rest of the path it is necessary to remove at least one of these guide members. The general purpose of the present invention is to remedy the above mentioned shortcomings by making available a transporting installation with conveyor and transport members resting on rollers above it and which would have a side guide system for the belt and centering of the roller bracket without dragging, easy to disassemble and with improved reliability as compared to the prior art systems.

SUMMARY OF THE INVENTION

In view of this purpose it was sought to provide in accordance with the present invention a transporting installation comprising at least one conveyor belt on which are mounted at intervals carriages each equipped above with a horizontal roller for support of transport members and side guide wheels running inside parallel opposing and facing C rails for support of roller and wheels with the carriage having a U bracket fastened on the belt and with seats opening upward on the U arms for support in a zone at the sides of the roller of a rolling pin for the roller with the ends of the pin projecting on the two sides of the bracket to each support one of said guide wheels with there being between the wheels and the bracket spacers removable transversally to the pin to free a space for axial running of the guide wheels towards the center of the carriage in such a manner as to be able to shift the wheels in the direction of withdrawing them from the C guide rails upon removal of the spacers.

BRIEF DESCRIPTION OF THE DRAWINGS

To clarify the explanation of the innovative principles of the present invention and its advantages compared with the prior art there is described below with the aid of the annexed drawings a possible embodiment thereof by way of non-limiting example applying said principles.

DETAILED DESCRIPTION OF THE INVENTION

Figure 1:
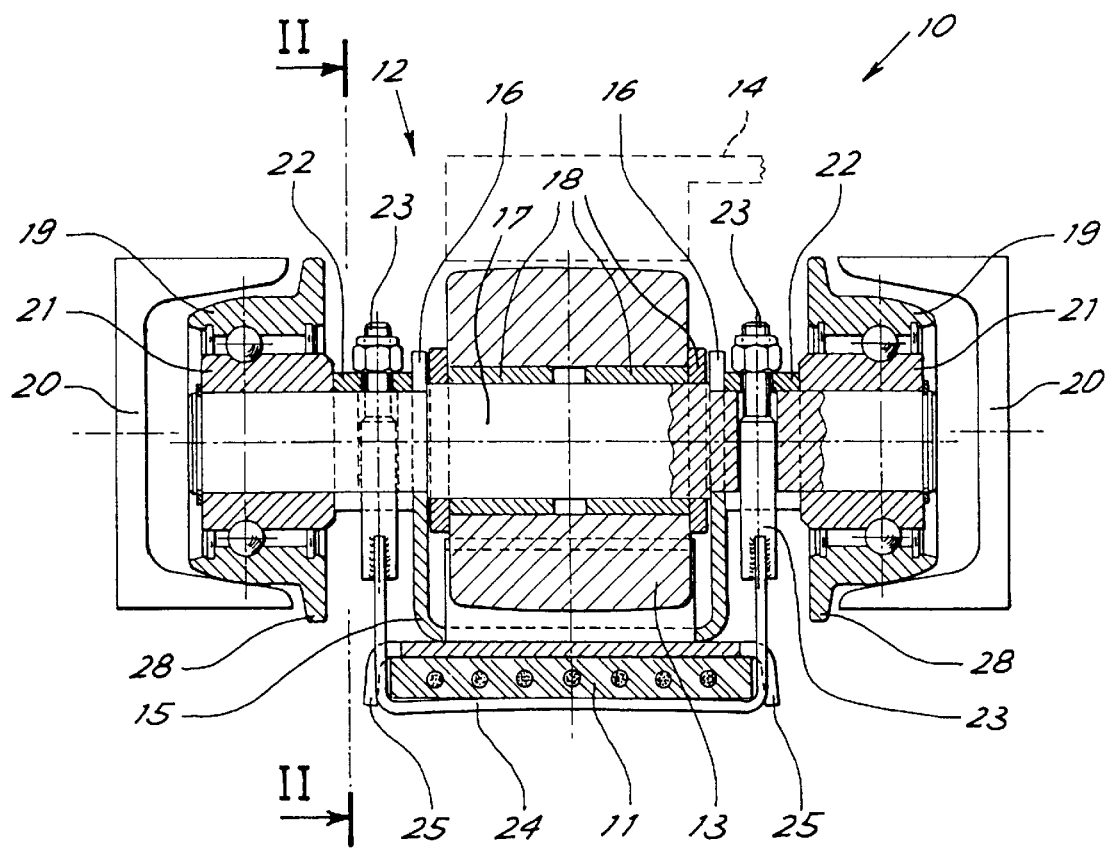
Figure 2:
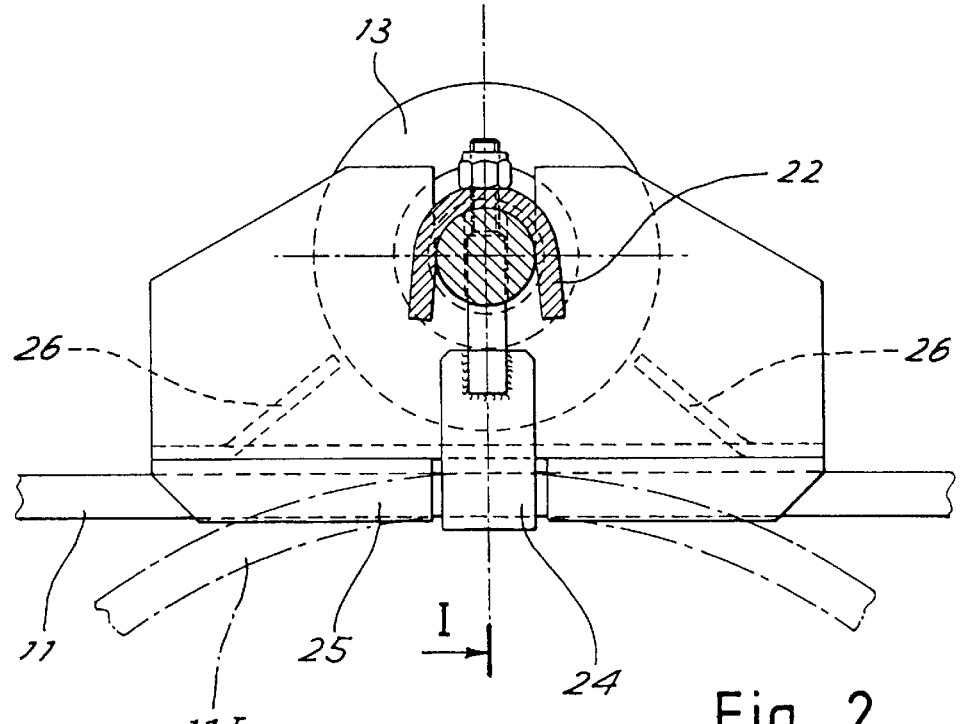
Figure 3:
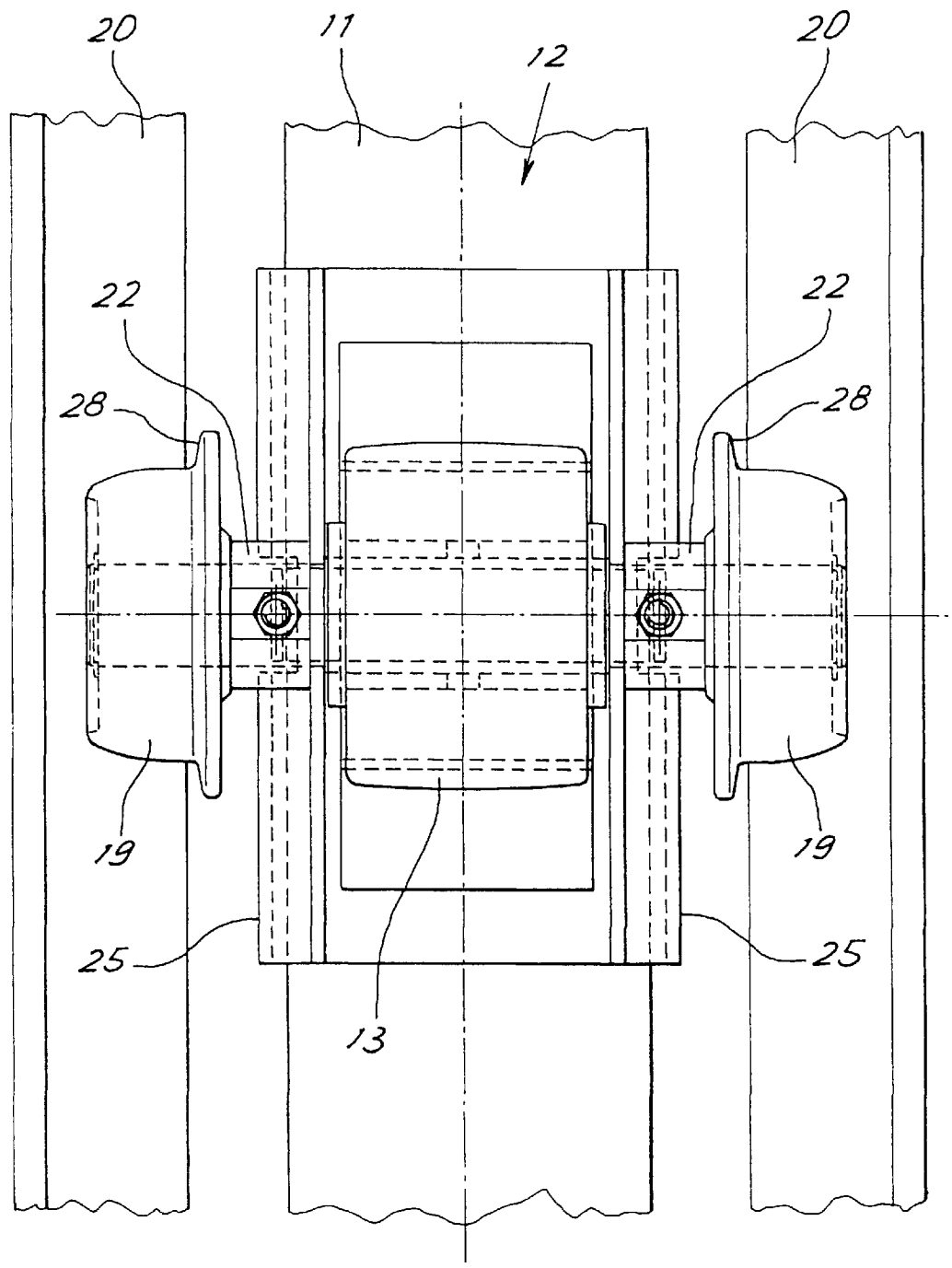
Figure 4:
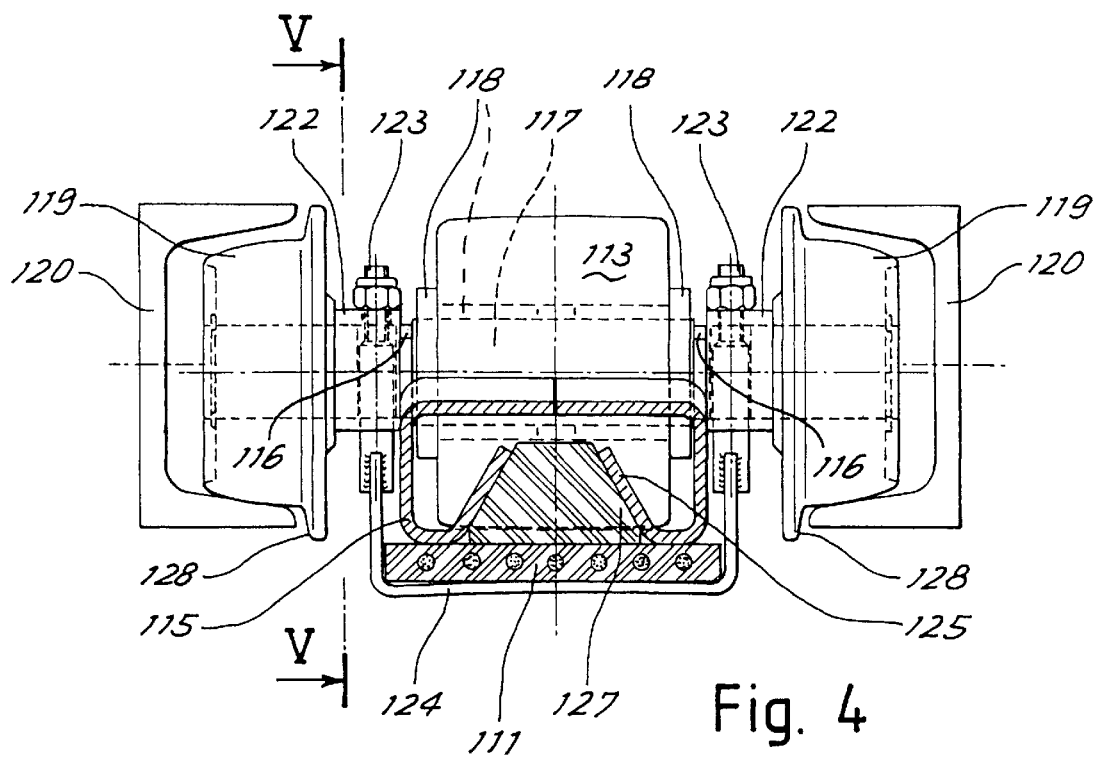
Figure 5:
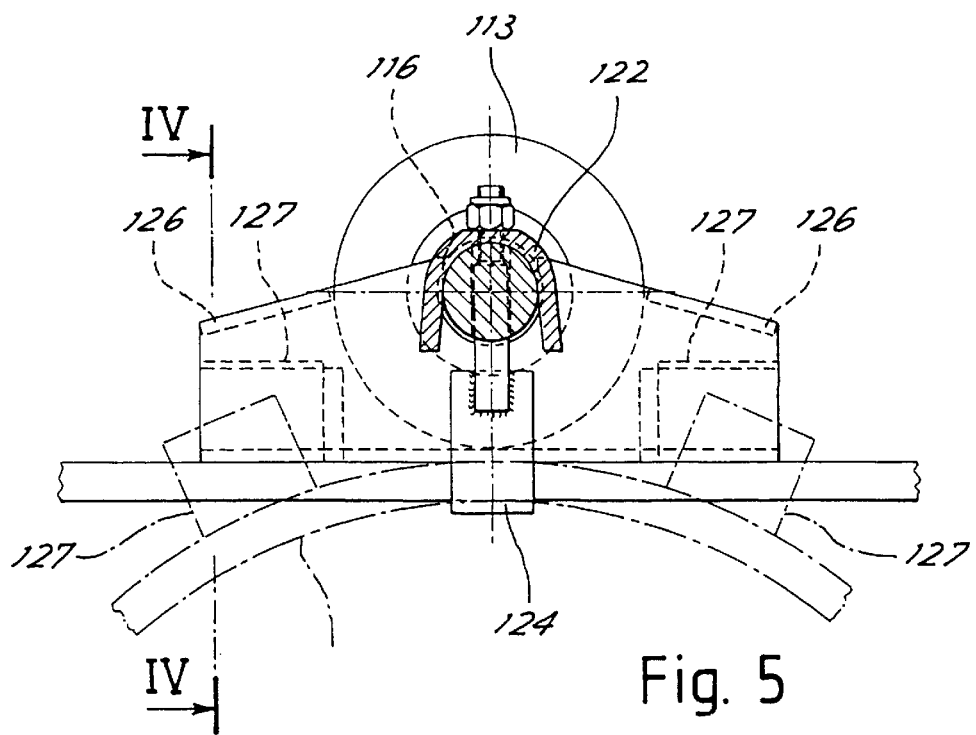

In the drawings:

FIG. 1 shows a partial diagrammatic cross section view of a first embodiment of a trasportating system in accordance with the present invention along plane of cut I—I of FIG. 2, FIG. 2 shows a view along plane of cut II—II of FIG. 1, FIG. 3 shows a plan view of the system of FIG. 1, and FIGS. 4 and 5 show views similar to those of FIGS. 1 and 2 but for a second embodiment of a transporting system in accordance with the present invention.

With reference to the figures FIG. 1 shows a transporting installation designated as a whole by reference number 10 comprising conveyor belts 11 on which are assembled at intervals carriages 12 (of which only one is shown) having rollers 13 for support and conveyance of transport members 14 such as skids, pallets, boards or the like. The structure of the transport members is not further shown or described here as it is known and readily imaginable to those skilled in the art.

The carriage 12 comprises a bracket 15 formed like the letter U to identify opposing arms in which are made slots 16 opening upward for support of a pin 17 supporting the roller 13. Rolling of the roller on the pin with appropriate friction is assured by sleeves 18.

The pin 17 projects on both sides of the bracket 15 to support at the ends (with interposition of bearings 21) running wheels 19 guided in opposing and facing C rails 20.

The wheels have side guide flanges 28.

Between each wheel 19 and the seat 16 for the pin 17 are spacers 22 in the form of an overturned U fitted from above on the pin to be removable by withdrawing in a direction transversal to the pin. The pin and the spacers are pierced vertically to be traversed by a threaded pin 23 on each side of the bracket and with upper tightening nut. The two threaded pins 23 are fastened below to the vertical arms of a U bolt 24 passing beneath the belt. In this manner the carriage 12 is fastened to the belt by tightening of the belt between the upper bracket 15 and the lower U bolt 24.

Advantageously the bracket 15 has containment tabs 25 descending on both sides of the belt to hold the carriage aligned with the belt and prevent side swerving.

As may be seen in FIGS. 2 and 3 there are advantageously tabs 26 directed radially towards the roller to graze its surface with their free edges and ensure surface cleaning thereof.

FIG. 2 shows the belt in its flat condition and in a curved condition indicated by 11b, for example for rotation around a snub pulley.

The wheels can run on the pin towards the inside of the carriage and are stopped axially in the operational position by spacers.

FIGS. 4 and 5 show a variant embodiment of the transporting installation. For the sake of simplicity members similar to those of the above embodiment are designated by the same reference numbers increased by 100.

Accordingly there is a transporting installation 110 comprising conveyor belts 111 on which are mounted at intervals carriages 112 each equipped with a roller 113 supported with the interposition of sleeves 118 by means of a pin 117 on a bracket 115 shaped like the letter U to identify opposing arms in which are made slots 116 for reception of the pin.

The pin 117 projects on both sides of the bracket 115 to support at its ends running wheels 119 guided in opposing and facing C rails 120. The wheels have side guide flanges 128.

Between each wheel 119 and the seat 116 for the pin 117 there are spacers 122 in the shape of an overturned letter U fitted from above on the pin to be removable by withdrawal in a direction transversal to the pin. The wheels can run on the pin towards the inside of the carriage and are stopped axially in the operational position by the spacers.

The pin and spacers are pierced vertically to be traversed by a threaded pin 123 on each side of the bracket and with top tightening nut. The two threaded pins 123 are fastened below to the vertical arms of a U-bolt 124 passing beneath the belt for clamping of the carriage to the belt.

Advantageously the bracket 115 has containment tabs 125 parallel to the belt extension and rising internally to receive an appropriate block 127 projecting from the belt surface on both sides of the wheel. This ensures alignment of the carriage on the belt. The blocks can be vulcanized directly on the belt. The blocks are free to enter and emerge from the space between the tabs upon belt bending as shown in FIG. 5.

Again advantageously there can be tabs 126 directed radially towards the roller to graze its surface with the free edges and ensure surface cleaning thereof.

It is now clear that the predetermined purposes have been achieved.

To disassembly a carriage it suffices to unscrew the nuts on the threaded pins so as to remove the lower U-bolt and the spacers and then shift the wheels axially towards the roller. In this manner the wheels emerge from the C seats of the rail and the rolling pin can be raised with the wheels and the roller to be removed from the bracket. The bracket can also be removed in this manner. As an alternative the belt can be lowered to allow rotation and withdrawal of the carriage.

In this manner the entire carriage can be easily and rapidly removed from the belt.

Despite the ease of removal and complementary ease of assembly the carriage in accordance with the present invention is firmly anchored to the belt and is free of deviation, unsteadiness and dragging problems which are common to prior art systems.

Naturally the above description of an embodiment applying the innovative principles of the present invention is given by way of non-limiting example of said principles within the scope of the exclusive right claimed here. For example the sizing of the parts could vary with specific requirements.

What is claimed is:

1. Transporting installation comprising at least one conveyor belt on which are mounted at intervals carriages each equipped above with a horizontal roller for support of transport members and side guide wheels running inside parallel opposing and facing C rails for support of roller and wheels with the carriage having a U bracket fastened on the belt and with seats opening upward on U arms for support in a zone at the sides of the roller of a rolling pin for the roller with the ends of the pin projecting on the two sides of the bracket to each support one of said guide wheels with there being between the wheels and the bracket spacers removable transversally to the pin to free a space for axial running of the guide wheels towards the center of the carriage in such a manner as to be able to shift the wheels in the direction of withdrawing them from the C guide rails upon removal of the spacers.

2. Installation in accordance with claim 1 wherein the spacers and supporting pin are pierced to be traversed by threaded stop pins projecting from the arms of a U-bolt arranged below the belt to hold the belt between the U-bolt and the bracket.

3. Installation in accordance with claim 1 wherein the spacers are in the form of an overturned U.

4. Installation in accordance with claim 1 wherein the bracket has side tabs descending on both sides of the belt.

5. Installation in accordance with claim 1 wherein the bracket has side tabs rising above the belt at the sides of blocks integral with the upper surface of the belt.

6. Installation in accordance with claim 1 wherein the carriage has tabs directed radially towards the roller to graze its surface with their free ends.

7. Installation in accordance with claim 1 wherein the wheels have side guide flanges.

* * * * *